(12) United States Patent
Sweeley et al.

(10) Patent No.: US 8,621,560 B2
(45) Date of Patent: Dec. 31, 2013

(54) USER AUTHENTICATION USING PERSONAL OBJECTS

(75) Inventors: Bryan Sweeley, Los Altos, CA (US);
Eng-Kiat Koh, Foster City, CA (US);
Teck Joo Chua, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 2702 days.

(21) Appl. No.: 11/349,470

(22) Filed: Feb. 6, 2006

(65) Prior Publication Data

US 2006/0272007 A1    Nov. 30, 2006

(30) Foreign Application Priority Data

May 25, 2005    (WO) ................ PCT/SG2005/000160

(51) Int. Cl.
*G06F 7/04*    (2006.01)
*G06F 15/16*    (2006.01)
*H04L 9/32*    (2006.01)

(52) U.S. Cl.
USPC ............................... 726/2; 713/168; 709/227

(58) Field of Classification Search
USPC .......................................................... 726/26
See application file for complete search history.

(56) References Cited

U.S. PATENT DOCUMENTS

| 5,377,270 | A | | 12/1994 | Koopman, Jr. et al. |
| 5,629,981 | A | * | 5/1997 | Nerlikar ........................ 713/168 |
| 6,934,842 | B2 | * | 8/2005 | Okamoto et al. ............. 713/168 |
| 7,245,213 | B1 | * | 7/2007 | Esterberg et al. ........ 340/539.12 |
| 7,312,707 | B1 | * | 12/2007 | Bishop et al. .............. 340/572.1 |
| 7,412,601 | B2 | * | 8/2008 | Shibata et al. ................ 713/161 |
| 7,548,152 | B2 | * | 6/2009 | Hillier ........................ 340/5.61 |
| 2002/0004767 | A1 | * | 1/2002 | Okamoto et al. ............... 705/28 |
| 2002/0093426 | A1 | * | 7/2002 | Jackson et al. ............. 340/572.7 |
| 2003/0012382 | A1 | * | 1/2003 | Ferchichi et al. ............. 380/270 |
| 2003/0231100 | A1 | | 12/2003 | Chung |
| 2005/0033619 | A1 | * | 2/2005 | Barnes et al. ..................... 705/7 |
| 2005/0061879 | A1 | * | 3/2005 | Honda .......................... 235/385 |
| 2005/0140507 | A1 | * | 6/2005 | Nam et al. ................ 340/539.13 |
| 2005/0234778 | A1 | * | 10/2005 | Sperduti et al. ................. 705/22 |
| 2005/0285739 | A1 | * | 12/2005 | Velhal et al. ............... 340/572.1 |
| 2006/0107061 | A1 | * | 5/2006 | Holovacs ...................... 713/182 |
| 2006/0123463 | A1 | * | 6/2006 | Yeap et al. ......................... 726/2 |
| 2006/0248577 | A1 | * | 11/2006 | Beghian et al. ................... 726/5 |

FOREIGN PATENT DOCUMENTS

JP        10155526    6/1998
TW         556076    10/2003

* cited by examiner

*Primary Examiner* — Techane Gergiso
(74) *Attorney, Agent, or Firm* — Stephen R. Tkacs; Stephen J. Walder, Jr.; Jeffrey S. LaBaw (57) ABSTRACT

A method and system of authentication for accessing one or more applications by a user by using a personal object belonging to the user. Such a personal object is one that is already in use by the user for purposes other than accessing the one or more applications.

34 Claims, 7 Drawing Sheets

USER AUTHENTICATION USING PERSONAL OBJECTS

CROSS-REFERENCE TO RELATED APPLICATIONS

Priority of International Patent Application No. PCT/SG2005/000160, filed on May 24, 2005, is claimed under 35 U.S.C. §120.

TECHNICAL FIELD

The present invention is directed to system security, and more specifically to using existing personal objects that a user owns and uses as part of an authentication scheme for accessing applications, such as enterprise applications, for example. An object ID associated with the personal object is used in various embodiments in the context of accessing the applications.

BACKGROUND

Frequently, access to applications is protected by weak authentication credentials. For example, users often use simple passwords that are easy to crack. Enterprises have a need for strong authentication credentials for protecting access to their enterprise application system for several reasons. For example, strong authentication credentials can be driven by regulatory compliance, risk mitigation and raising the level of identity assurance. In one approach, in order to raise the level of identity assurance, enterprises implement a two-factor authentication. A two-factor authentication combines a password with an authentication token. Such a two-factor authentication leverages what the user possesses (the authentication token) and what the user knows (the password).

Authentication tokens are special-purpose devices that are built for the specific purpose of user identification in the context of authentication. Authentication tokens can be smart cards, one-time passwords (OTP) devices, and proximity cards.

Smart cards provide a public/private key pair that can be used for authentication. OTP devices dynamically generate a unique code for use as a dynamic password for user authentication. Proximity cards are access cards that provide an RFID that uniquely identifies a given access card.

One problem with using special-purpose authentication devices like smart cards, OTP devices, and proximity cards is that such devices are expensive to deploy. Enterprises need to provision all their users with such special-purpose devices. Further, each special-purpose authentication device needs to be registered and replaced when damaged or lost.

Special-purpose authentication devices are inconvenient to use. A given user may be required to carry multiple special-purpose authentication devices as each application provider may require a different token for authenticating to applications in the provider's system.

In view of the foregoing, there is a need for a method and system for strengthening authentication credentials without the high cost and inconvenience of special-purpose authentication devices.

DETAILED DESCRIPTION

According to one aspect of certain embodiments, a user that wishes to access applications is authenticated using an authentication scheme that includes an existing personal object that is owned and used by the user for purposes other than authentication. Some examples of personal objects include a watch, driver license, keychain, wallet, jewelry, thumb drive, PDA, mobile phone, handheld devices, etc. According to one aspect, an object ID associated with the personal object is electronically read and used in the authentication. Identity assurance in the context of authentication is strengthened by leveraging common day-to-day personal objects that are already in use by the user who is attempting to access one or more applications. A single personal object is thus capable of providing strong authentication for accessing multiple existing applications with little or no change to the applications.

According to certain embodiments, the object ID may be an embedded ID such as a device serial number. Optionally, the embedded ID may be augmented by an object tag. An object tag is a tag that can be easily applied to any personal object and can be read by a computing device, such as a personal computer or PDA. Examples of object tags include universal product codes (UPC bar code), RFID-based electronic product codes (EPC) and optical character recognition (OCR) labels.

According to one aspect of certain embodiments, an object ID reader reads an object ID of the user's personal object. An electronic agent on a computing device interfaces with the object ID reader to obtain the object ID. The electronic agent then injects the object ID as a password when asked for authentication credentials when the user attempts to access a given enterprise application, according to certain embodiments. According to certain other embodiments, the object ID is used in conjunction with the user's application password to form an extended password. The extended password is used to access the desired application. Optionally, the application server may re-direct the extended password to a directory or to an object verifier for authentication.

According to yet other embodiments, once a password that includes the object ID is authenticated, either the electronic agent or the object verifier dynamically generates a single-use password or OTP. The dynamically generated OTP is used to access the desired application.

Figure 1:
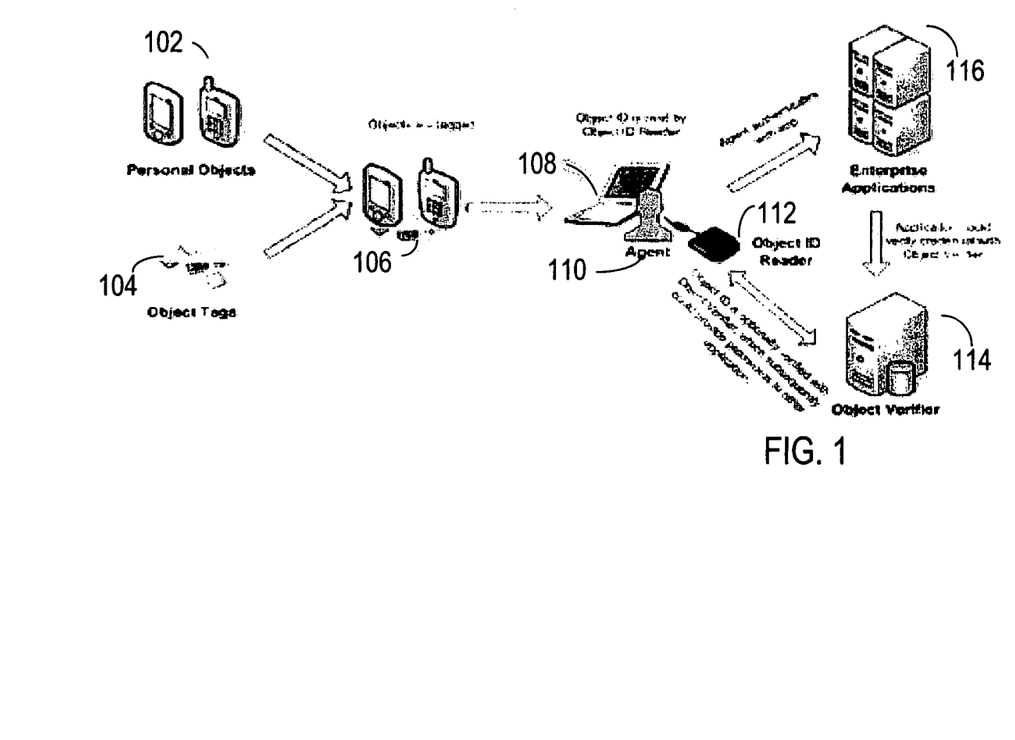
FIG. 1 is a high-level block diagram that illustrates some components used in a personal object authentication system, according to certain embodiments.

FIG. 1 is a high-level block diagram that illustrates some components used in a personal object authentication system, according to certain embodiments. In FIG. 1, a personal object such as personal objects 102 is optionally tagged with an object tag such as object tags 104 to produce a tagged personal object such as tagged personal objects 106. An object ID reader 112 reads an object ID of the tagged personal object. The object ID reader 112 interfaces with a computing device 108. Electronic agent 110 is implemented on computing device 108. Electronic agent 110 obtains the object ID from object ID reader 112. Electronic agent 110 is adapted to interface with electronic object ID reader 112, application server 116 and object verifier 114.

According to certain embodiments, electronic agent 110 uses the object ID to authenticate with enterprise application server 116 in an attempt to gain access to one or more enterprise applications for the user. Upon successful authentication, the user is granted access to the enterprise applications. Optionally, as an additional step in the authentication procedure, the enterprise application server may re-direct authentication information that includes the object ID to a directory or object verifier 114 for authentication. In certain other embodiments, electronic agent 110 can direct authentication credentials that include the object ID to object verifier 114 for verification. Object verifier 114 verifies the authenticity of the object ID. Upon successful verification, object verifier 114 can provide application login credentials for each application that the user wishes to access.

The object ID of the user's personal object can be an embedded object ID such as an embedded device serial number. Optionally, object tags can be applied to the user's personal object for the purpose of providing an object ID to the electronic agent 110. Examples of object tags are various types of universal product codes (UPC) including linear bar codes, composite bar codes, two-dimensional bar codes, and matrix bar codes. Other examples of object tags are RFID-based electronic product codes (EPC), and optical character recognition (OCR) labels. Such tags can be conveniently glued to any personal object of the user's choosing. UPC, EPC, OCR and similar tags are relatively inexpensive. Thus, any personal object can be converted to an authentication device at affordable mass market prices.

The object ID reader can be implemented in hardware or software or a combination thereof. The object ID reader can be implemented as a separate device or may be embedded in the host device such as computing device 108 of FIG. 1. According to certain embodiments, the object ID reader is a bar code reader that can be implemented as a separate reader that is linked to a host computing device through a serial interface or a USB interface. According to another implementation, the object ID reader can be a compact flash card suitable for small host devices such as PDAs. The object ID reader can also be an EPC reader that can be implemented as a PCMCIA card or as a USB device to the host computing device. According to certain other embodiments, the object reader is adapted for querying any USB device, such as a thumb drive, for the USB device ID.

An agent, such as electronic agent 110 of FIG. 1, can be implemented in hardware or software or a combination thereof in a host computing machine such as personal computer, PDA or server. The role of the electronic agent is described in greater detail herein with reference to FIGS. 2-7.

Figure 2:
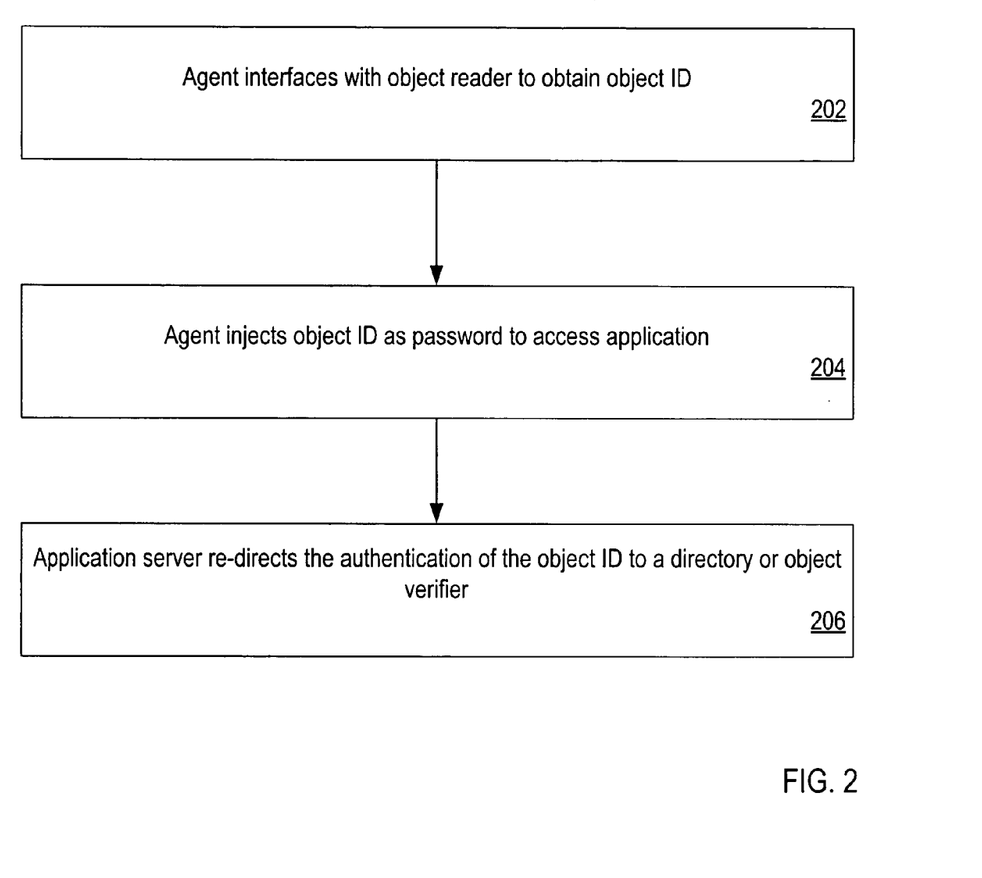
FIG. 2 is a flowchart that illustrates the use of an object ID as an application password, according to certain embodiments.

FIG. 2 is a flowchart that illustrates the use of an object ID as an application password, according to certain embodiments. For purposes of explanation, assume that a user wishes to access one or more enterprise applications. Further, assume that the authentication scheme for protecting access to the one or more enterprise applications includes the use of an object ID of a selected personal object of the user.

At block 202 in FIG. 2, an electronic agent, such as agent 110 of FIG. 1, interfaces with an object reader, such as object reader 112 of FIG. 1, to obtain the object ID of the selected personal object. For example, the object ID reader can query for the embedded object ID of the personal object or read the object ID tag on the personal object and pass the object ID to the electronic agent.

At block 204, the electronic agent injects the object ID as a password to access an application that the user wishes to use. The application that the user wishes to use is herein also referred to as a desired application. The direct use of the object ID as a password to the desired application is an example of single-factor authentication scheme. The application server that is managing the desired application authenticates the injected password. Upon successful authentication, the user is allowed access to the desired application.

Optionally, at block 206, the application server can re-direct the authentication of the object ID to a remote directory or to an object verifier such as object verifier 114 of FIG. 1. Upon successful authentication of the object ID by the directory or object verifier, the user is allowed access to the desired application.

Figure 3:
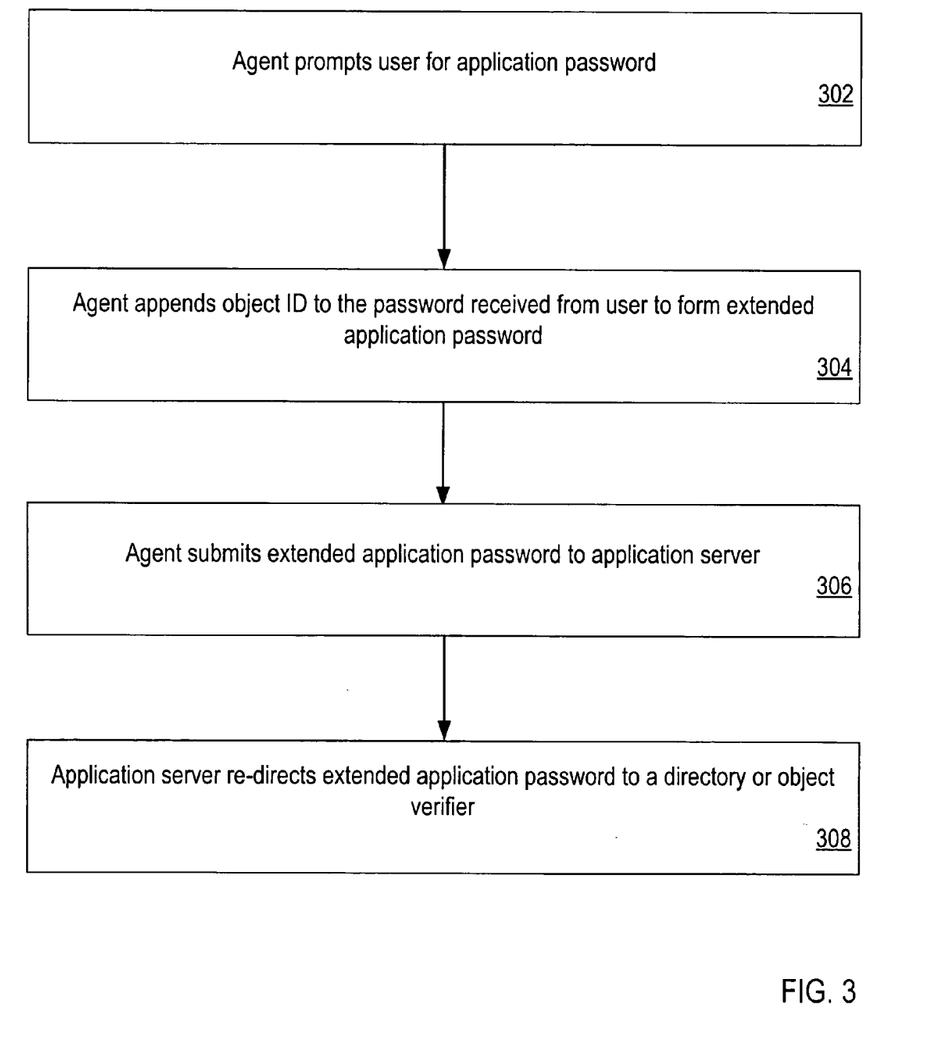
FIG. 3 is a flowchart that illustrates the use of an object ID in the form of an extended password for accessing one or more applications, according to certain embodiments.

FIG. 3 is a flowchart that illustrates the use of an object ID in the form of an extended password for accessing one or more applications, according to certain embodiments. As described with reference to FIG. 2, the electronic agent interfaces with an object reader to obtain the object ID of the selected personal object. At block 302 in FIG. 3, the agent prompts the user for the application password for the desired application. At block 304, upon receiving the application password received from the user, the electronic agent appends the object ID to the application password to form an extended application password. In other words, the selected user's personal object is used as a second factor in a two-factor authentication scheme. At block 306, the electronic agent then submits the extended application password as authentication credentials to the application server for accessing the desired application. Upon successful authentication, the user is allowed access to the desired application.

Optionally, at block 308, the application server can re-direct the extended application password to a remote directory or to an object verifier such as object verifier 114 of FIG. 1. Upon successful authentication of the extended application password by the directory or object verifier, the user is allowed access to the desired application.

Figure 4:
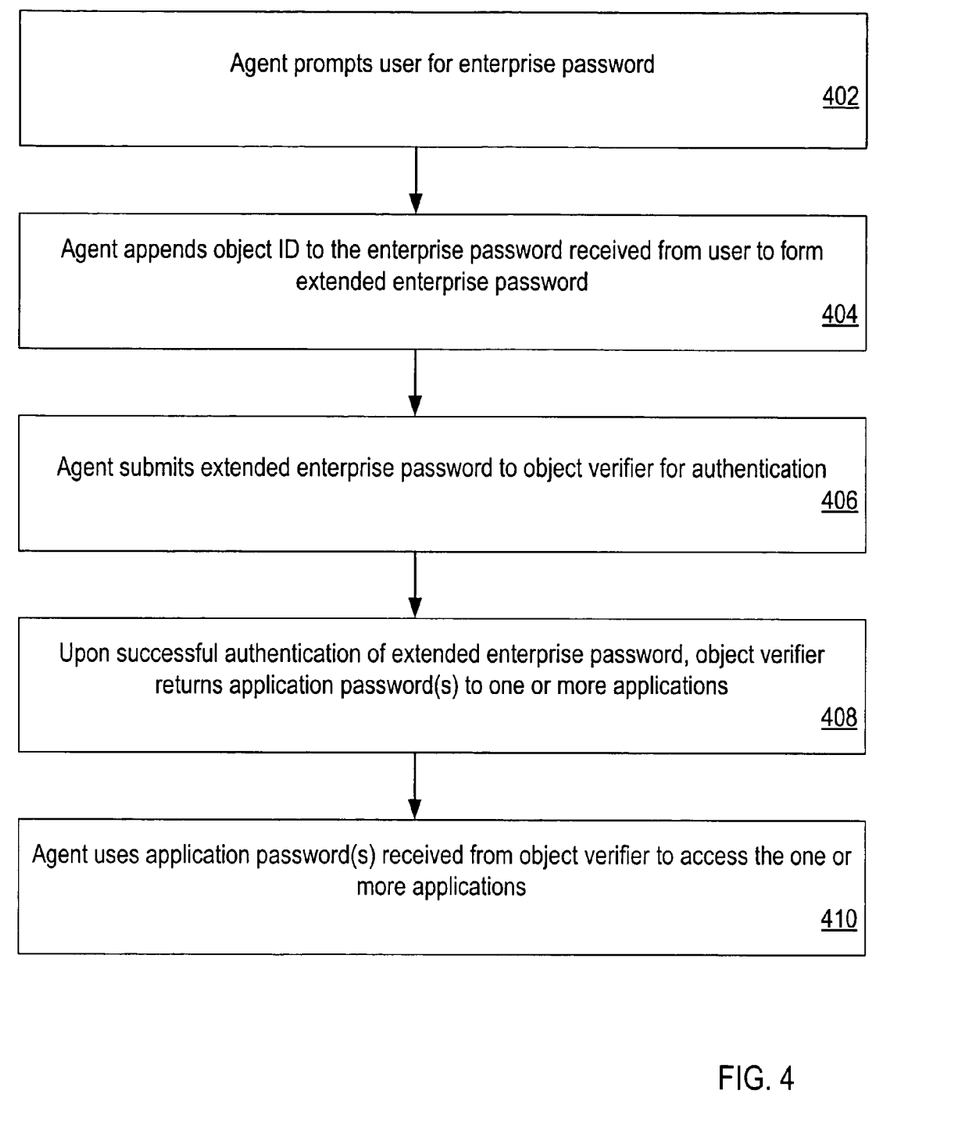
FIG. 4 is a flowchart that illustrates the use of an object ID for obtaining application passwords, according to certain embodiments.

FIG. 4 is a flowchart that illustrates the use of an object ID for obtaining application passwords, according to certain embodiments. As described with reference to FIG. 2, the electronic agent interfaces with an object reader to obtain the object ID of the selected personal object. At block 402 of FIG. 4, the agent prompts the user for an enterprise password. At block 404, upon receiving an enterprise password from the user, the electronic agent appends the object ID to the enterprise password to form an extended enterprise password. At block 406, the electronic agent then submits the extended enterprise password as authentication credentials to a remote object verifier for authentication.

Upon successful authentication at the object verifier, then at block 408, the object verifier returns an application password associated with the desired application to the agent. At block 410, the agent submits the application password received from the object verifier to the application server to access the desired application for the user. Optionally, upon receiving the application password from the agent, the application server can re-direct the received application password back to the object verifier for authentication. In such a case, only upon initial successful authentication at the object verifier is the user allowed to access the desired application.

Figure 5:
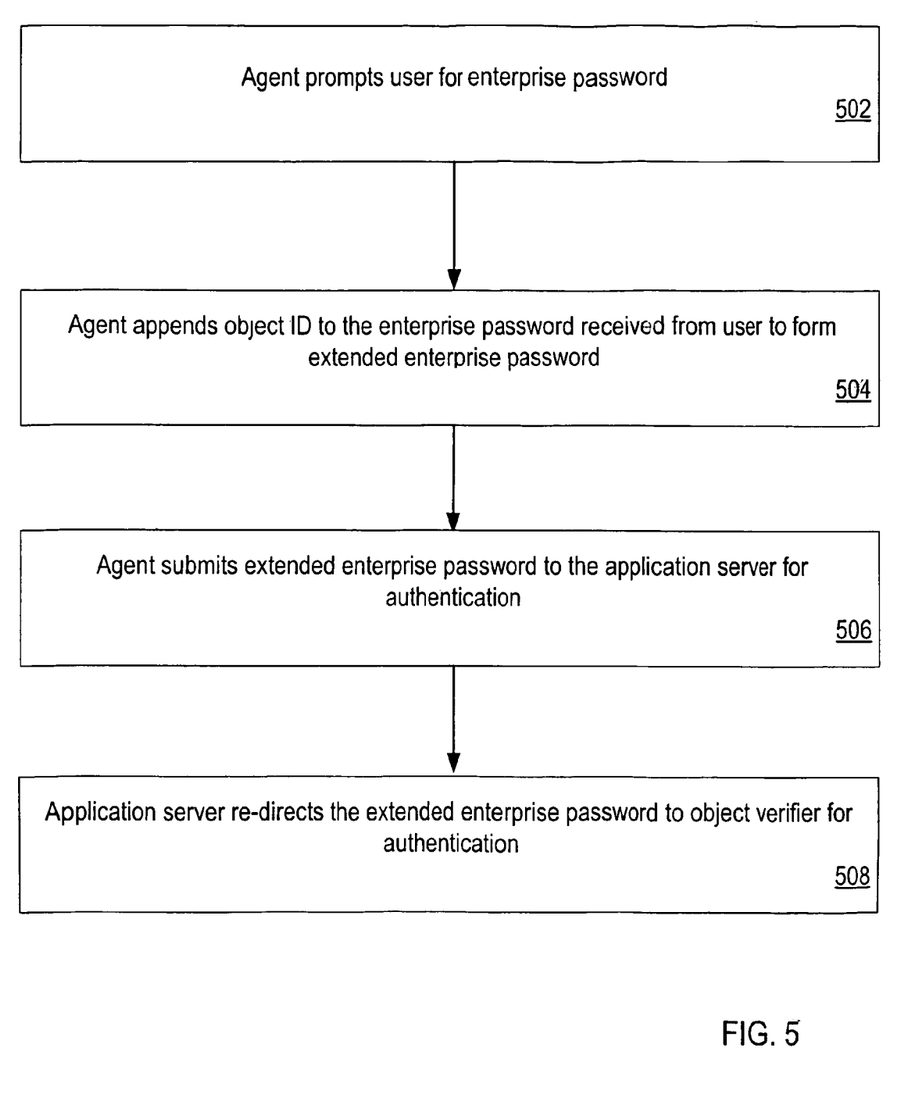
FIG. 5 is a flowchart that illustrates the use of an object ID in an extended enterprise password for accessing one or more applications, according to certain embodiments.

FIG. 5 is a flowchart that illustrates the use of an object ID in an extended enterprise password for accessing one or more applications, according to certain embodiments. As described with reference to FIG. 2, the electronic agent interfaces with an object reader to obtain the object ID of the selected personal object. At block 502 of FIG. 5, the agent prompts the user for an enterprise password. At block 504, upon receiving an enterprise password from the user, the electronic agent appends the object ID to the enterprise password to form an extended enterprise password. At block 506, the electronic agent then submits, to the application server, the extended enterprise password as authentication credentials in an attempt to access the desired application.

Upon receiving the extended enterprise password from the agent, the application server can re-direct the received extended enterprise password to the object verifier for authentication. Upon successful authentication at the object verifier, the user is allowed to access the desired application.

Figure 6:
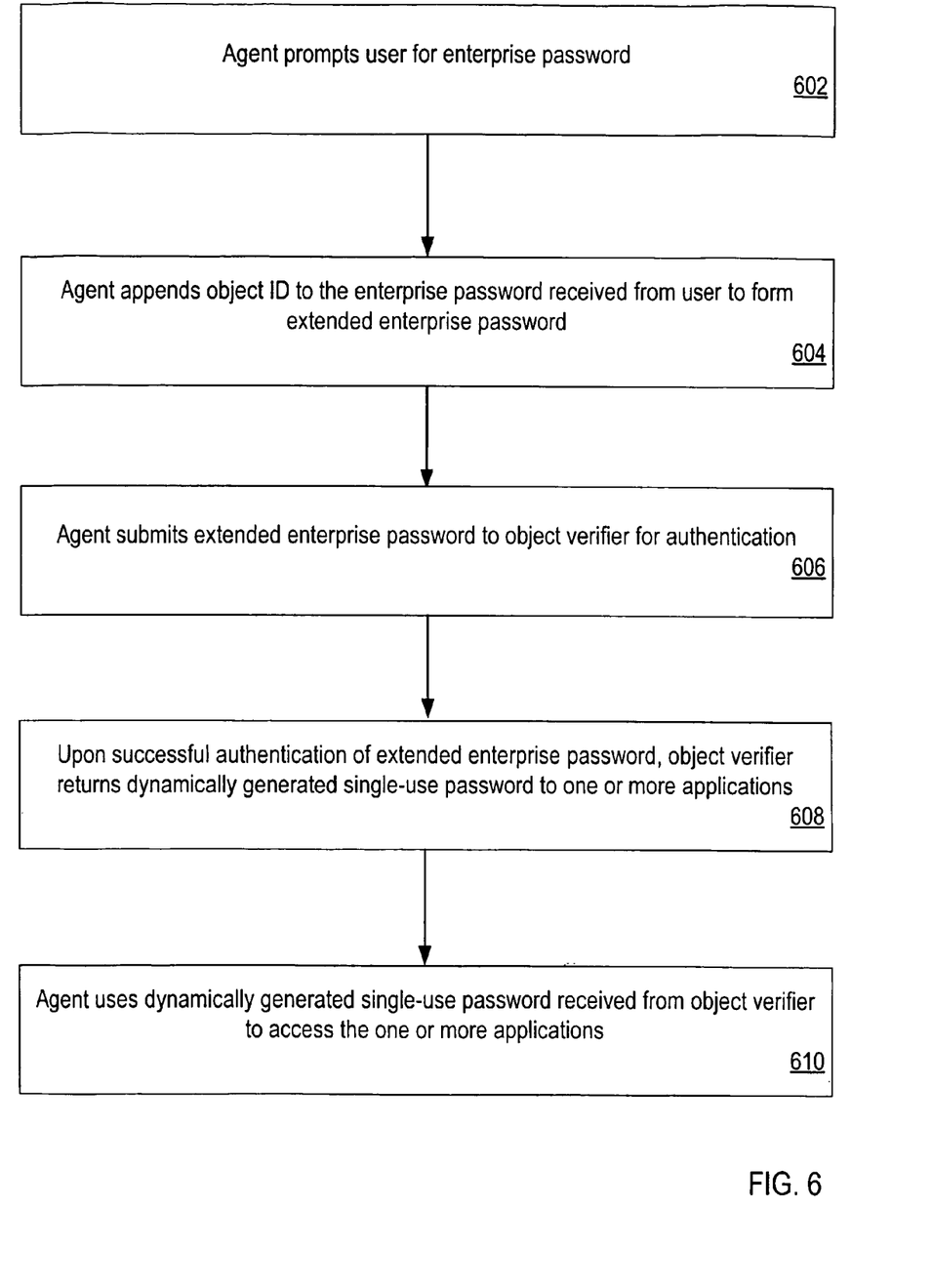
FIG. 6 is a flowchart that illustrates the use of an object ID in the context of obtaining OTP passwords from an object verifier, according to certain embodiments.

FIG. 6 is a flowchart that illustrates the use of an object ID in the context of obtaining OTP passwords from an object verifier, according to certain embodiments. As described with reference to FIG. 2, the electronic agent interfaces with an object reader to obtain the object ID of the selected personal object. At block 602 of FIG. 6, the agent prompts the user for an enterprise password. At block 604, upon receiving an enterprise password received from the user, the electronic agent appends the object ID to the enterprise password to form an extended enterprise password. At block 606, the electronic agent then submits the extended enterprise password as authentication credentials to a remote object verifier for authentication.

Upon successful authentication at the object verifier, at block 608, the object verifier returns a dynamically generated single-use password or OTP password to the agent. At block 610, the agent uses the dynamically generated single-use password received from the object verifier to access the desired application for the user. Optionally, upon receiving the dynamically generated single use password from the agent, the application server can re-direct the received dynamically generated single-use password back to the object verifier for authentication. In such a case, only upon successful authentication at the object verifier is the user allowed to access the desired application.

Figure 7:
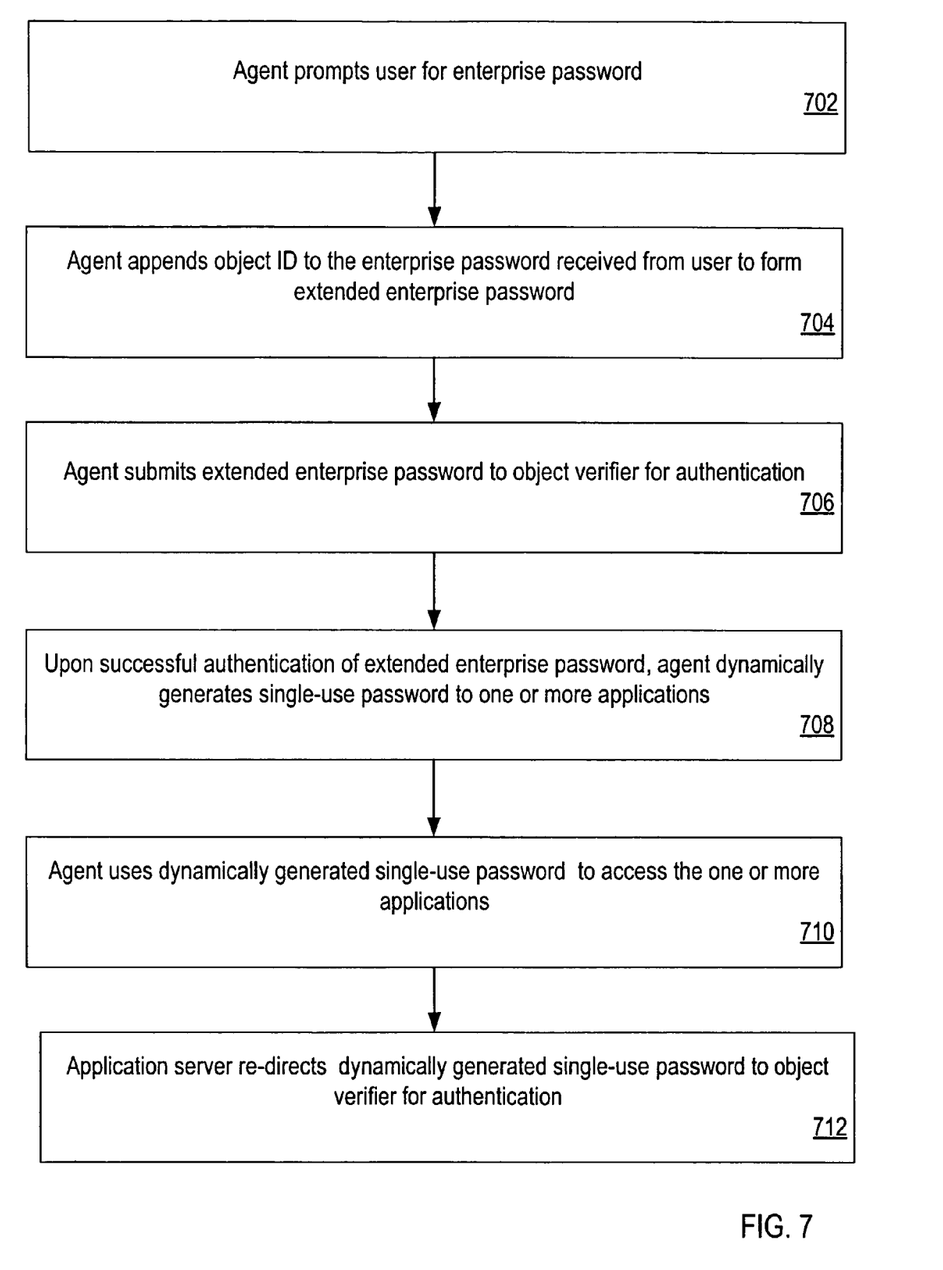
FIG. 7 is a flowchart that illustrates the use of an object ID in the context of an agent generating OTP passwords, according to certain embodiments.

FIG. 7 is a flowchart that illustrates the use of an object ID in the context of an agent generating OTP passwords, according to certain embodiments. As described with reference to FIG. 2, the electronic agent interfaces with an object reader to obtain the object ID of the selected personal object. At block 702 of FIG. 7, the agent prompts the user for an enterprise password. At block 704, upon receiving an enterprise password from the user, the electronic agent appends the object ID to the enterprise password to form an extended enterprise password. At block 706, the electronic agent then submits the extended enterprise password as authentication credentials to a remote object verifier for authentication.

Upon successful authentication at the object verifier, at block 708, the electronic agent proceeds to dynamically generate a single-use password or OTP password. At block 710, the agent submits the dynamically generated single-use password to the application server to access the desired application for the user. Upon receiving the dynamically generated single-use password from the agent, the application server re-directs the received dynamically generated single-use password to the object verifier for authentication. Upon successful authentication at the object verifier, the user allowed to access the desired application.

In the foregoing specification, embodiments of the invention have been described with reference to numerous specific details that may vary from implementation to implementation. It will be evident that various modifications and changes may be made thereto without departing from the broader spirit and scope of the invention. The specification and drawings are, accordingly, to be regarded in an illustrative rather than a restrictive sense.

We claim:

1. A computer-implemented method for providing a user secure access to a plurality of applications on an application server, the computer-implemented method comprising:
   receiving an object ID associated with a personal object;
   receiving an application password from the user;
   appending the object ID to the application password to form an extended application password;
   sending the extended application password to an object verifier for verification as a password for accessing said plurality of applications;
   receiving a dynamically generated single-use password from said object verifier for accessing one or more applications of said plurality of applications responsive to successful authentication at said object verifier; and
   using said dynamically generated single-use password from said object verifier for accessing said one or more applications on the application server.

2. The computer-implemented method of claim 1, wherein said personal object is any personal object from a set of personal objects comprising:
   a watch;
   a driver license;
   a credit card;
   a bank card;
   a keychain;
   a wallet;
   a piece of jewelry;
   a thumb drive;
   a PDA;
   a mobile phone; or
   a handheld device.

3. The computer-implemented method of claim 1, wherein said object ID is an embedded ID.

4. The computer-implemented method of claim 1, wherein said object ID is an embedded device serial number.

5. The computer-implemented method of claim 1, wherein said object ID is a UPC bar code.

6. The computer-implemented method of claim 5, wherein said UPC bar code is a linear UPC code.

7. The computer-implemented method of claim 5, wherein said UPC bar code is a two-dimensional UPC code.

8. The computer-implemented method of claim 5, wherein said UPC bar code is a composite UPC code.

9. The computer-implemented method of claim 5, wherein said UPC bar code is a matrix UPC code.

10. The computer-implemented method of claim 1, wherein said object ID is an optical character recognition code.

11. The computer-implemented method of claim 1, wherein said object ID is an RFID-based electronic product code (EPC).

12. The computer-implemented method of claim 1, further comprising electronically obtaining said object ID by querying an electronic object ID reader for said object ID.

13. The computer-implemented method of claim 1, further comprising electronically obtaining said object ID by interfacing with an electronic object ID reader for said object ID.

14. The computer-implemented method of claim 1, wherein said one or more applications verify said dynamically generated single-use password at said object verifier responsive to said one or more applications receiving said dynamically generated single-use password for authentication.

15. The computer-implemented method of claim 1, wherein the personal object is a personal object that a user already uses for purposes other than accessing the plurality of applications.

16. An authentication system for authenticating a user who wishes to access a plurality of applications, said authentication system comprising:
- an object ID reader; wherein the object ID reader is configured to read an object ID, wherein the object ID is associated with a personal object belonging to a user;
- an agent for communicating with an application server associated with said plurality of applications and an object verifier, wherein the agent is configured to:
- receive the object ID associated with the personal object;
- receive an application password from the user;
- append the object ID to the application password to form an extended application password;
- send the extended application password to the object verifier for verification as a password for accessing said plurality of applications;
- receive a dynamically generated single-use password from the object verifier for accessing one or more applications of the plurality of applications responsive to successful authentication at the object verifier; and
- use the dynamically generated single-use password from the object verifier for accessing the one or more applications on the application server.

17. The authentication system of claim 16, wherein said agent interfaces with said object ID reader to obtain said object ID.

18. The authentication system of claim 16, wherein said object ID reader is implemented as a combination of software and hardware.

19. The authentication system of claim 16, wherein said object ID reader is implemented in software.

20. The authentication system of claim 16, wherein said object ID reader is implemented in hardware.

21. The authentication system of claim 16, wherein said agent is implemented as a combination of software and hardware.

22. The authentication system of claim 16, wherein said agent is a software implementation.

23. The authentication system of claim 16, wherein said agent is a hardware implementation.

24. The authentication system of claim 16, wherein said personal object is any personal object from a set of personal objects comprising:
- a watch;
- a driver license;
- a keychain;
- a wallet;
- a credit card;
- a bank card;
- a piece of jewelry;
- a thumb drive;
- a PDA;
- a mobile phone; or
- a handheld device.

25. The authentication system of claim 16, wherein said object ID is an embedded ID.

26. The authentication system of claim 16, wherein said object ID is an embedded device serial number.

27. The authentication system of claim 16, wherein said object ID is a universal product code (UPC) bar code.

28. The authentication system of claim 27, wherein said UPC bar code is a linear UPC code.

29. The authentication system of claim 27, wherein said UPC bar code is a two-dimensional UPC code.

30. The authentication system of claim 27, wherein said UPC bar code is a composite UPC code.

31. The authentication system of claim 27, wherein said UPC bar code is a matrix UPC code.

32. The authentication system of claim 16, wherein said object ID is an optical character recognition code.

33. The authentication system of claim 16, wherein said object ID is an RFID-based electronic product code (EPC).

34. The authentication system of claim 16, wherein the personal object is a personal object that a user already uses for purposes other than accessing the plurality of applications.

* * * * *